United States Patent
Shin et al.

(10) Patent No.: US 6,169,580 B1
(45) Date of Patent: Jan. 2, 2001

(54) METHOD FOR AUTOMATICALLY ADJUSTING TIME DIFFERENCE FOR VIDEO INSTRUMENT

(75) Inventors: Keun Cheol Shin, Suwon; Sang Bong Park, Pyungtaek, both of (KR)

(73) Assignee: LG Electronics, Inc., Seoul (KR)

( * ) Notice: Under 35 U.S.C. 154(b), the term of this patent shall be extended for 0 days.

(21) Appl. No.: 09/017,496

(22) Filed: Feb. 2, 1998

(30) Foreign Application Priority Data

Feb. 3, 1997 (KR) .................................................... 97-3712

(51) Int. Cl.[7] .............................. H04N 7/00; H04N 7/08
(52) U.S. Cl. ...................... 348/460; 348/461; 348/473; 348/725; 368/10; 386/95
(58) Field of Search .................................... 348/460, 461, 348/464, 467, 468, 473, 476, 478; 368/1, 9, 10, 46–52; 386/83; H04N 7/08, 7/00

(56) References Cited

U.S. PATENT DOCUMENTS

| | | |
|---|---|---|
| 5,329,500 | 7/1994 | Baik et al. . |
| 5,561,461 * | 10/1996 | Landis et al. .......................... 348/460 |
| 5,608,534 | 3/1997 | Park et al. . |
| 5,617,146 * | 4/1997 | Duffield et al. ....................... 348/460 |

* cited by examiner

Primary Examiner—Michael H. Lee

(57) ABSTRACT

A method for automatically adjusting a time difference for a video instrument is disclosed, which includes a first step for setting and storing a time difference adjusting data, a second step for selecting a corresponding channel in accordance with a key input of a user, a third step for detecting a broadcasting station ID and a time data from the selected channel broadcasting signal, a fourth step for reading a time difference data corresponding to the detected broadcasting station ID from a memory, a fifth step for adding the read time difference adjusting data and the detected time data, a sixth step for performing a time adjusting operation in accordance with the added time data, and a seventh step for performing a time adjusting operation in accordance with the added time data.

14 Claims, 5 Drawing Sheets

| | RECEIVING REGION (BROADCASTING STATION ID) | | | |
|---|---|---|---|---|
| | BROADCASTING STATION 1 | BROADCASTING STATION 2 | BROADCASTING STATION 3 | .... |
| RECEIVING REGION | REGION 1 | +9 | +1 | −1 | |
| | REGION 2 | +8 | −2 | 0 | |
| | REGION 3 | −17 | +5 | −5 | |
| | ⋮ | | | | |

UNIT : TIME(H)

METHOD FOR AUTOMATICALLY ADJUSTING TIME DIFFERENCE FOR VIDEO INSTRUMENT

BACKGROUND OF THE INVENTION

1. Field of the Invention

The present invention relates to a method for automatically adjusting a time difference for a video instrument, and in particular to an improved method for automatically adjusting a time difference for a video instrument which is capable of automatically adjusting a time difference based on a broadcasting signal transmission region and a broadcasting signal receiving region.

2. Description of the Background Art

FIG. 1 illustrates a conventional automatic time setting apparatus based on is a broadcasting signal, which includes a tuner 10 for selecting a channel signal among the broadcasting signals inputted through an antenna ANT, a time data detector 11 for detecting a time data from the broadcasting signal selected by the tuner 10, an input unit 12 for receiving an input signal selected by a user, a timer 13 for setting a time, a display unit 14 for displaying the time set by the timer 12, and a microcomputer 15 for detecting the output signal from the input unit 12 and adjusting the time of the timer 13 in accordance with a time data inputted from the time data detector 11.

The operation of the conventional automatic time setting apparatus will now be explained with reference to the accompanying drawings.

When a user selects a broadcasting channel using the input unit 12, the microcomputer 15 detects the output signal from the input unit 12 and controls the tuner 10.

The tuner 10 selects a broadcasting channel corresponding to the broadcasting channel selected by the user among the high frequency broadcasting signals of each channel inputted through the antenna ANT, namely, the tuning data outputted from the microcomputer 15 and the time data detector 11 detects the time data from the broadcasting signals selected by the tuner 10 and outputs the thusly detected data to the microcomputer 15.

The method for detecting the time data from the broadcasting signal is disclosed in U.S. Pat. No. 5,329,500 which is pertained to the same assignee of this application.

Namely, a high frequency current time data is received from the broadcasting station and then is amplified and demodulated, thus converting the data into a digital signal. The thusly converted digital signal is decoded, and a time data is detected. Therefore, the microcomputer 15 checks the alignment of bits of the decoded time data and recognizes the time.

In addition, the microcomputer 15 judges whether the selected broadcasting signal is a broadcasting signal which is first received after the operation power is applied. If the selected broadcasting signal is the broadcasting signal which is first received after the operation power is applied, the microcomputer 15 transmits the time data outputted from the time data detector 11 to the timer 13 and sets the current time. The set time is displayed on the display unit 14.

If the selected broadcasting signal is not the broadcasting signal which is first received after the operation power is applied, the microcomputer 15 recognizes that the time adjusting operation was already performed at the time when the broadcasting signal was first received. Therefore, the time setting operation is not performed.

However, when a user who lives in the regions near the time differential line receives a broadcasting signal or satellite broadcasting signal from the broadcasting system of the different region which is located opposite with respect to the time differential line, since the conventional automatic time setting apparatus sets the time based on the time data contained in the broadcasting signal without using the time difference between the region in which the broadcasting signal is transmitted and the region in which the broadcasting signal is received, the user may incorrectly set the time.

Therefore, various functions which are set based on the time such as a program or system ON/OFF reservation function of the video instrument may be incorrectly set, thus causing much inconvenience when setting the time or reserving a program or the like.

SUMMARY OF THE INVENTION

Accordingly, it is an object of the present invention to provide a method for automatically adjusting a time difference for a video instrument which overcomes the aforementioned problems encountered in the background art.

It is another object of the present invention to provide a method for automatically adjusting a time difference for a video instrument which is capable of automatically adjusting the time difference based on a broadcasting signal transmitting region and a broadcasting signal receiving region when a user who lives in the region near the time differential line receives a broadcasting signal or satellite broadcasting signal from the other region which is located opposite with respect to the time differential line.

To achieve the above objects, there is provided a method for automatically adjusting a time difference for a video instrument according to a first embodiment which includes the steps of a first step for setting and storing a time difference adjusting data, a second step for selecting a corresponding channel in accordance with a key input of a user, a third step for detecting a broadcasting station ID and a time data from the selected channel broadcasting signal, a fourth step for reading a time difference data corresponding to the detected broadcasting station ID from a memory, a fifth step for adding the read time difference adjusting data and the detected time data, a sixth step for performing a time adjusting operation in accordance with the added time data, and a seventh step for performing a time adjusting operation in accordance with the added time data.

To achieve the above objects, there is provided a method for automatically adjusting a time difference for a video instrument according to a second embodiment which includes the steps of setting a reserved program recording data setting mode, setting a broadcasting channel, a reserved program recording start time, a reserved program recording stop time, and a recording speed in the reserved program recording data setting mode, recognizing the set broadcasting channel as a broadcasting station ID, judging whether the broadcasting signal transmitting region is located in the region in which a time difference occurs based on the recognized broadcasting station ID, and performing the reserved time adjusting operation of the reserved program recording start time and reserved program recording stop time when the broadcasting signal transmitting region is in the region in which the time difference occurs as a result of the judgement and terminating the reserved time adjusting operation when the broadcasting signal transmitting region is in the region in which the time difference does not occur.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
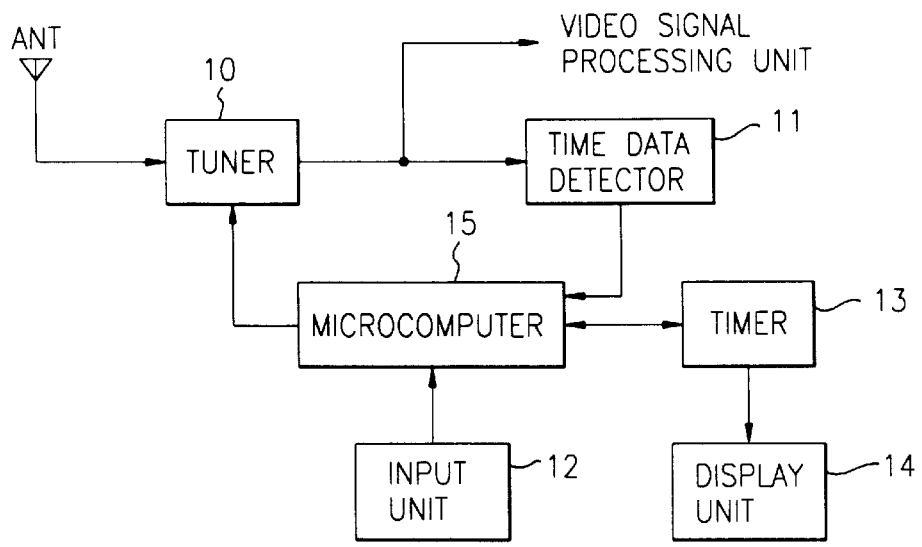
FIG. 1 is a block diagram illustrating a conventional automatic time setting apparatus with respect to a broadcasting signal.
Figure 2:
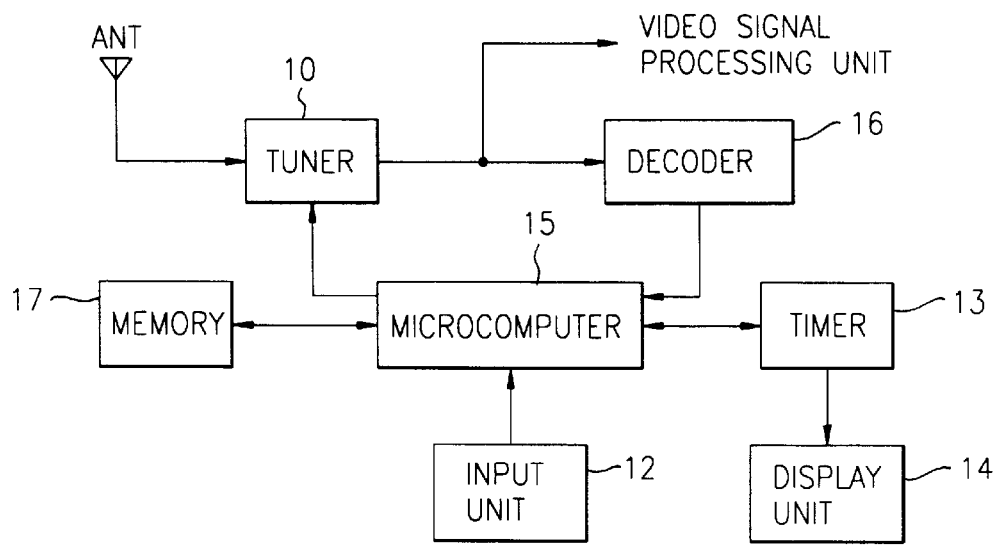
FIG. 2 is a block diagram illustrating an automatic time setting apparatus according to the present invention.

The automatic time setting apparatus according to the present invention, as shown in FIG. 2, further includes a memory 17 compared to the construction of the conventional automatic time setting apparatus, as shown in FIG. 1. In addition, in the construction of the automatic time setting apparatus according to the present invention, the time data detector 11 which is used in the conventional art is substituted with a decoder 16.

The decoder 16 is used for detecting a broadcasting station ID and time data from a broadcasting signal of a channel selected by the tuner 10, and the memory 18 is provided to store a time difference adjusting data between a signal transmitting region and a signal receiving region based on the broadcasting station ID. At this time, the signal transmitting region is recognized based on the broadcasting station ID.

The operation of the automatic time setting apparatus according to the present invention will now be explained with reference to the accompanying drawings.

Figures 3, 4:
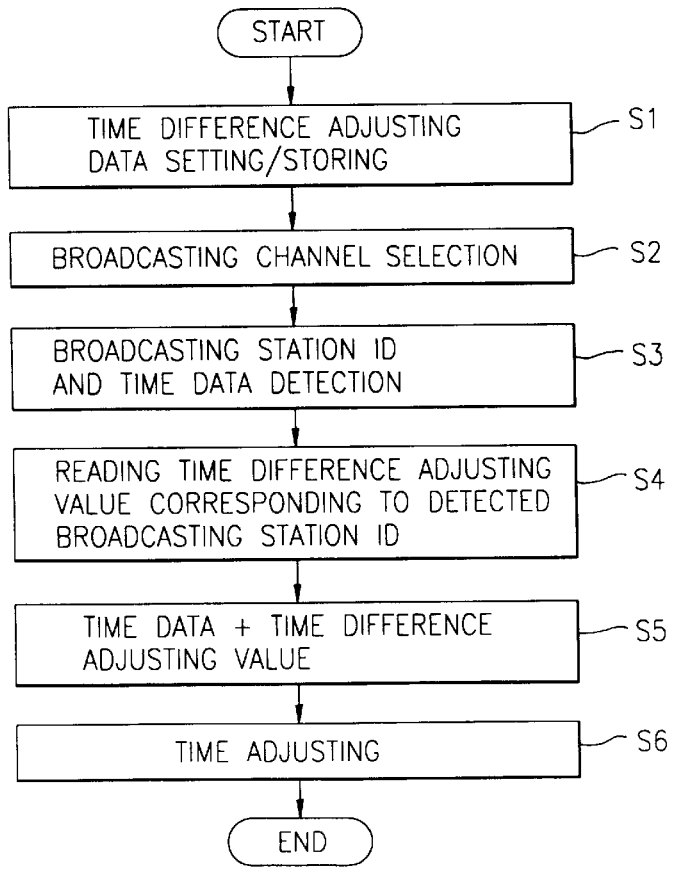
FIG. 3 is a view illustrating a time difference adjusting data table of a broadcasting signal transmission region and a receiving region stored in a memory.
FIG. 4 is a flow chart illustrating a time difference automatic adjusting method for a video instrument according to a first embodiment of the present invention.

First, as shown in FIG. 3, the time difference adjusting data between the broadcasting signal transmitting region and the broadcasting signal receiving region which are selected based on a plurality of broadcasting stations and regions and the broadcasting station IDs by the broadcasting channel are stored in the memory 17 in Step S1.

In the above state, when a user selects a broadcasting channel using the input unit 12, the microcomputer 15 detects the output signal from the input unit 12 and controls the tuner 10 for selecting a broadcasting signal of the thusly selected channel in Step S2.

The decoder 16 detects the broadcasting station ID and the time data from the selected broadcasting signals. At this time, the time data is selected by the method disclosed in U.S. Pat. No. 5,329,500, and as disclosed in U.S. Pat. No. 5,608,534, the pilot signal is detected from the broadcasting signal selected by the tuner 10 and the broadcasting station ID is detected based on the detected pilot signal in Step S3.

Therefore, the microcomputer 15 receives the broadcasting station ID and time date from the decoder 16 and reads the time difference adjusting data corresponding to the detected broadcasting station ID from the memory 17 in Step S4. The read time difference adjusting data and time data are added for computing the adjusting time. Thereafter, the timer 13 is controlled in Steps S5 and S6, so that the time of the current transmitting region is adjusted to the time of the receiving region and is displayed on the display unit 14.

For example, the following assumptions are given. Namely, a user of the region 1 selects a broadcasting channel from the broadcasting signals from the broadcasting station 1, and the time data detected by the decoder 16 is 8:00 pm, Jan. 20, 1998.

Figure 5:
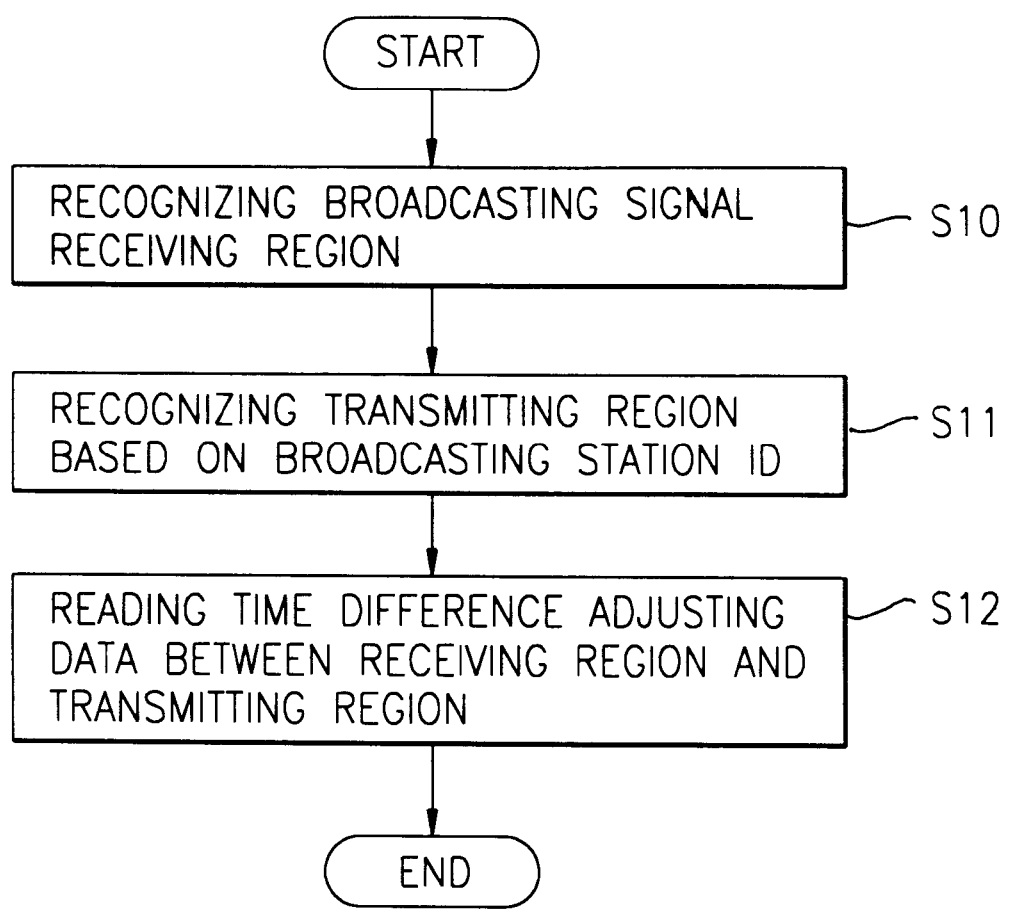
FIG. 5 is a flow chart illustrating a method for reading a time difference adjusting data from a memory.

In this case, the microcomputer 15, as shown in FIG. 5, recognizes the broadcasting receiving region I in which the user is currently positioned in Step S10 and recognizes the broadcasting signal 1 (namely, the transmitting region) from the broadcasting station IDs detected by the decoder 16 in Step S1.

When the broadcasting signal transmitting region and receiving region are recognized, the microcomputer 15 reads a time difference adjusting data "+9(H)" corresponding to the broadcasting station 1 and the receiving region 1 in Step S12, and the time data of "8:00 pm, Jan. 20, 1998" and the time difference adjusting data of "9(H)" are added. Thereafter, the time data of "5:00 am, Jan. 21, 1998" is displayed on the display unit 14 as a current time by controlling the timer 13.

Figure 6:
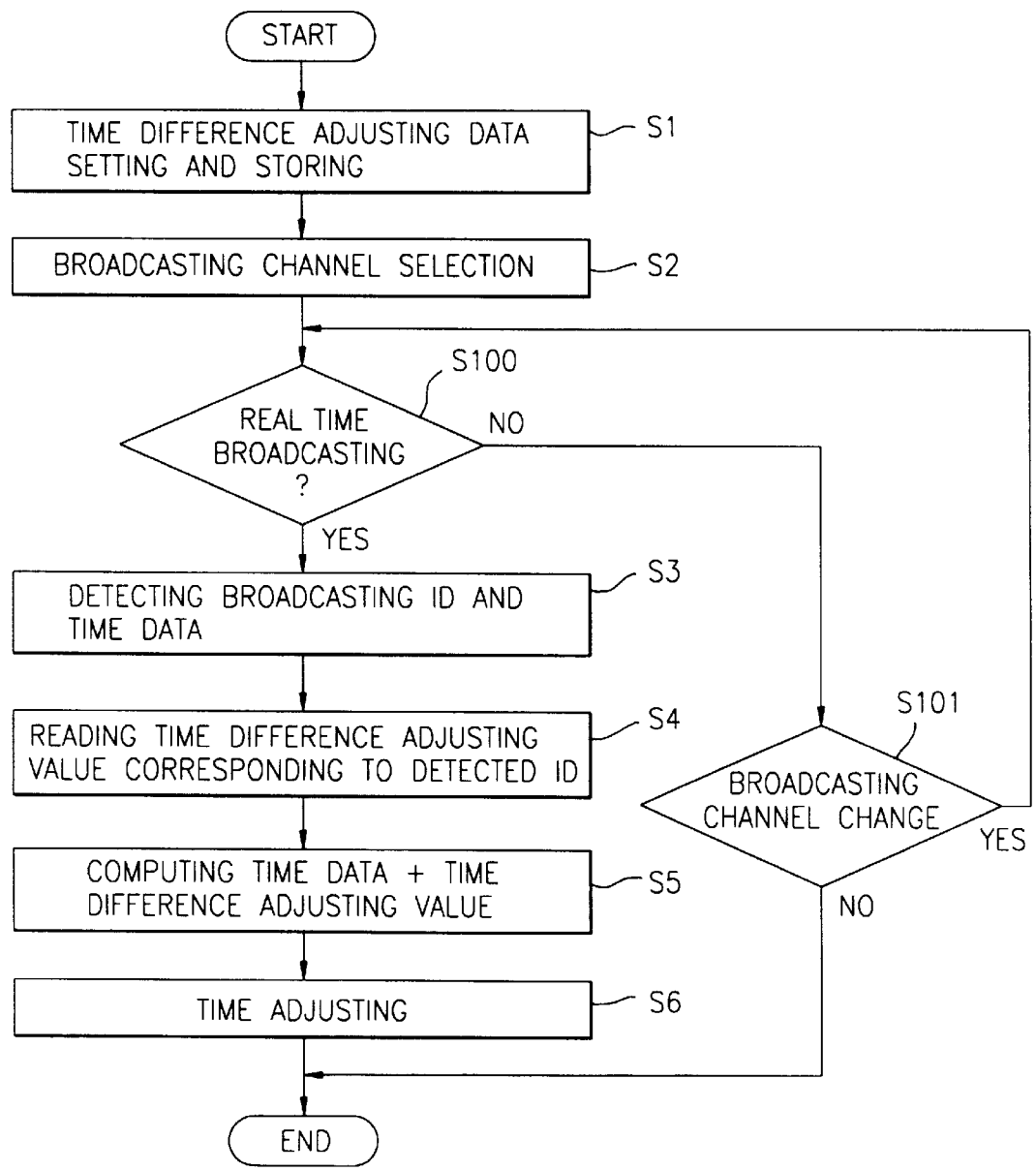
FIG. 6 is a flow chart illustrating a time difference adjusting method for a video instrument according to a second embodiment of the present invention.

FIG. 6 illustrates a time difference adjusting method for a video instrument according to a second embodiment of the present invention. The microcomputer 15 checks whether the broadcasting signal of the selected channel is a real time broadcasting signal in Step S100. If the signal is the real time broadcasting signal, the time adjusting operation shown in FIG. 4 is performed. At this time, the real time broadcasting denotes an air band broadcasting, and the non-real time broadcasting is a broadcasting such as a cable broadcasting.

If the broadcasting signal of the selected channel is not a real time broadcasting, it is checked whether the broadcasting channel is changed by the user in Step S101. If the broadcasting signal of the changed broadcasting channel is a real time broadcasting, the time adjusting operation is performed.

The above-described operation corresponds to the time difference adjusting method adapted when the user currently watches a TV program. Since the video instrument such as a television has a program reserving and recording function, the user sets a program reserving and recording mode of a predetermined broadcasting channel and the thusly recorded program is reproduced after a predetermined time.

Figure 7:
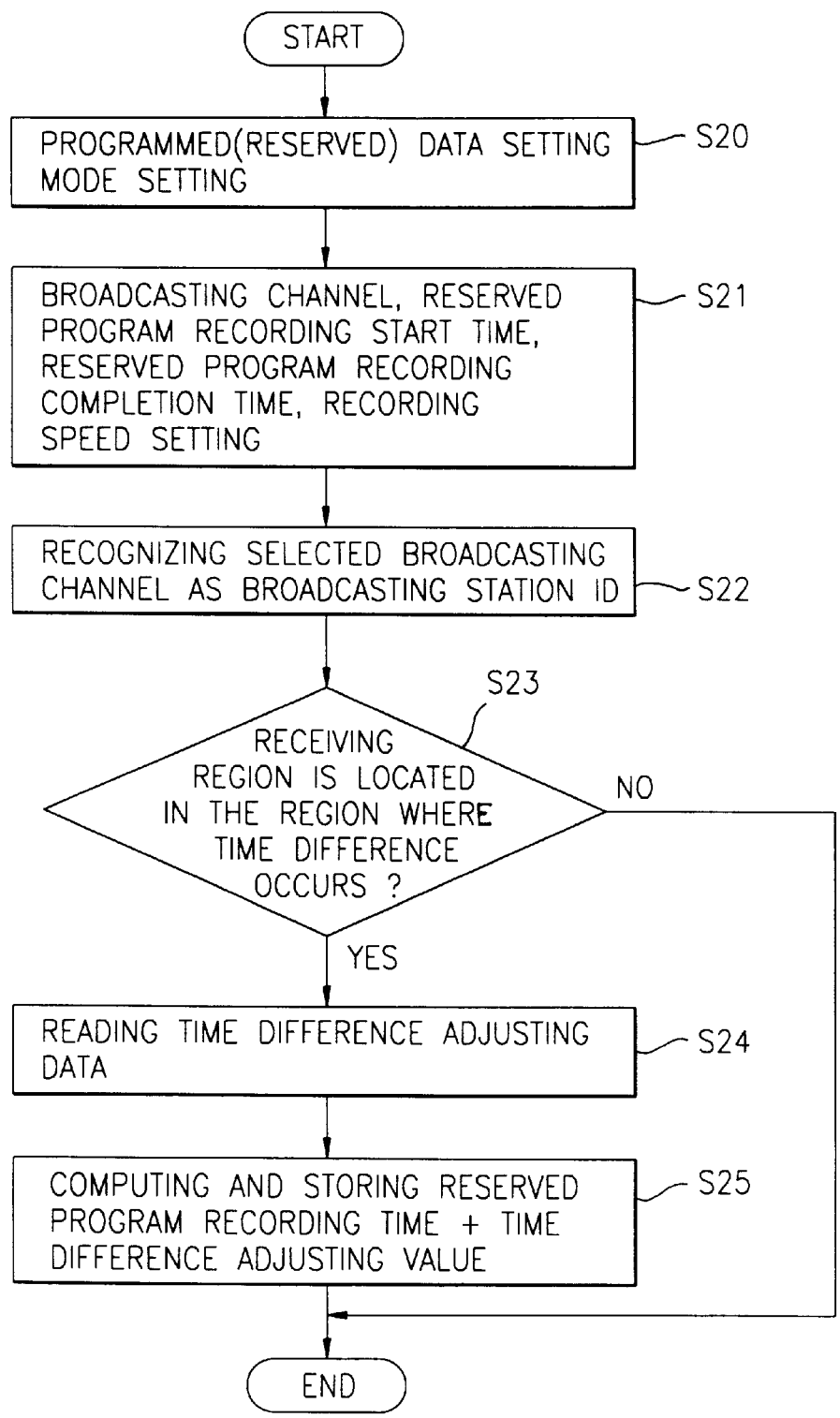
FIG. 7 is a flow chart illustrating a time difference adjusting method for a video instrument according to a third embodiment of the present invention.

FIG. 7 illustrates a time difference automatic adjusting method in a program reserving and recording mode according to a third embodiment of the present invention.

First, the user sets the program reserving and recording data setting mode using the input unit 12 in Step S20, and sets, in Step S21, the data such as a broadcasting channel, reserved program recording start time, reserved program recording completion time, recording speed, etc. which are used for the program reserving operation.

When the data input is completed, the microcomputer 15 recognizes the reserved broadcasting channel as a broadcasting station ID in Step S22 and checks whether the broadcasting signal transmitting region is located in the region in which the time difference occurs in Step S23.

As a result of the checking, if the broadcasting signal transmitting region is located in the region in which the time difference occurs, the microcomputer 15 reads a time difference adjusting between the broadcasting signal transmitting and receiving regions and adds the reserved program recording start time and reserved program recording completion time and the time difference adjusting data, set a newly reserved program recording start time and reserved program recording completion time, and stores the time data into the memory such as an EEPROM.

Therefore, it is possible to reserve a program of a desired broadcasting channel in accordance with the newly reserved program recording start time and reserved program recording completion time.

As described above, when a user in the region near the time differential line watches a broadcasting program or a satellite broadcasting program from different regions, the time difference between two different regions is automatically adjusted based on the time difference therebetween, so that the user recognizes a correct time.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for automatically adjusting a time difference for a video instrument, comprising the steps of:
   a first step for setting and storing time difference adjusting data;
   a second step for selecting a corresponding channel in accordance with a key input of a user;
   a third step for detecting a broadcasting station ID and time data from the selected channel broadcasting signal;
   a fourth step for reading the time difference adjusting data corresponding to the detected broadcasting station ID from a memory;
   a fifth step for computing, without user input, a time difference based on a comparison of the read time difference adjusting data with the detected time data;
   a sixth step for performing a time adjusting operation in accordance with the computed time difference data.

2. The method of claim 1, wherein in said first step, the time differences of a broadcasting signal transmitting region and a broadcasting signal receiving region are tabled and stored.

3. The method of claim 2, wherein said broadcasting signal transmitting region is recognized as a broadcasting station ID.

4. The method of claim 1, wherein said fourth step includes the steps of:
   recognizing a broadcasting signal receiving region;
   recognizing a broadcasting signal receiving region from the detected broadcasting station ID; and
   reading a time difference adjusting data corresponding to the recognized signal transmitting and receiving regions.

5. The method of claim 1, wherein said sixth step includes a step for displaying an adjusted time on a display unit.

6. A method for automatically adjusting a time difference for a video instrument, comprising the steps of:
   a first step for setting and storing time difference adjusting data;
   a second step for selecting a corresponding channel in accordance with a key input of a user;
   a third step for checking whether the selected channel broadcasting signal is a real time broadcasting program (live program); and
   a fourth step for performing, without user input, a time adjusting operation when the selected channel broadcasting signal is a real time broadcasting program as a result of the checking of the third step and terminating the time adjusting operation of the selected channel broadcasting signal is not a real time broadcasting program.

7. The method of claim 6, wherein the time adjusting operation includes:
   detecting a broadcasting station ID and a time data from the selected channel broadcasting signal;
   reading a time difference adjusting data corresponding to the detected broadcasting station ID from a memory; and
   computing the time difference based on the comparison of the read time difference adjusting data with the detected time data.

8. The method of claim 7, wherein said real time broadcasting (live) is an air band program.

9. The method of claim 7, wherein in said first step, the time difference adjusting data is data obtained by tabling the time difference between a broadcasting signal transmitting region and a broadcasting signal receiving region.

10. The method of claim 7, wherein said broadcasting signal transmitting region is recognized as a broadcasting station ID.

11. The method of claim 6, wherein said fourth step includes the steps of:
   checking whether the broadcasting channel is changed when the selected channel broadcasting signal is not a real time broadcasting program; and repeatedly performing the third step when the channel is changed as a result of the checking and terminating the time difference adjusting operation when the channel is not changed.

12. A method for automatically adjusting a time difference for a video instrument, comprising the steps of:

setting and storing a time difference adjusting data;

setting a broadcasting channel, a reserved program recording start time, a reserved program recording stop time, and a recording speed in the reserved program recording data setting mode;

recognizing the set broadcasting channel as a broadcasting station ID;

reading time difference adjusting data corresponding to the recognized broadcasting station ID from a first memory; and performing without user input, a reserved time adjusting operation using the reserved program recording start time and reserved program recording stop time in accordance with the time difference adjusting data, wherein the reserved time adjusting operation includes, computing a time difference based on the comparison of the read time difference adjusting data with the reserved program recording start time and reserved program recording stop time; and storing the adjusted reserved program recording time based on the computed time difference.

13. The method of claim 12, wherein said first memory is a RAM, and said second memory is an EEPROM.

14. The method of claim 12, wherein said time difference adjusting data is a time difference adjusting value between the broadcasting signal transmitting region and receiving region based on the broadcasting station ID.

* * * * *